Figure 1:
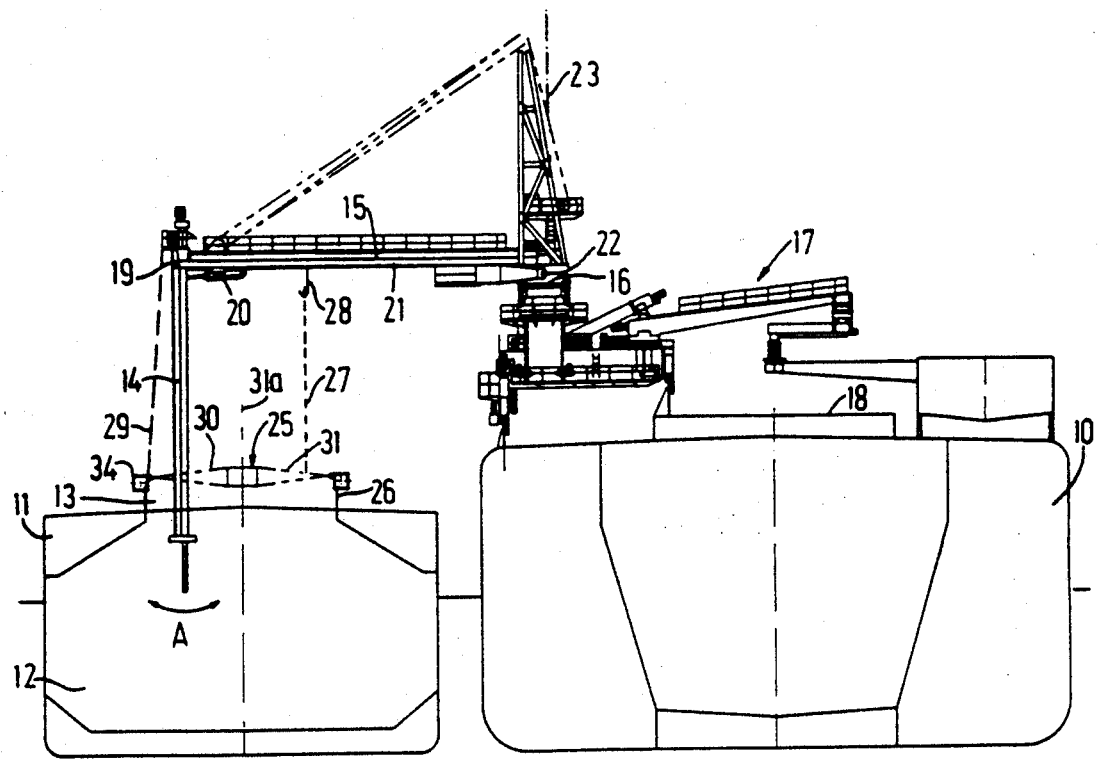

United States Patent [19]
Aralt

[11] Patent Number: 4,990,045
[45] Date of Patent: Feb. 5, 1991

[54] ARRANGEMENTS FOR UNLOADING BULK MATERIAL FROM HOLDS OF CARGO VESSELS

[76] Inventor: Per T. Aralt, Hopsnesvn. 75, N-5043 Hop, Norway

[21] Appl. No.: 386,359

[22] Filed: Jul. 27, 1989

[51] Int. Cl.$^5$ .................. B63B 19/14; B63B 27/00
[52] U.S. Cl. ........................ 414/137.4; 114/201 R; 414/292
[58] Field of Search .............. 114/201 R; 414/137.4, 414/140.7, 291, 292

[56] References Cited

U.S. PATENT DOCUMENTS

| 1,640,188 | 8/1927 | Grunbock | 414/137.4 |
| 1,780,322 | 11/1930 | Tsuji | 414/137.4 |
| 2,849,010 | 8/1958 | Marino | 414/137.4 |
| 4,714,097 | 12/1987 | Binzen et al. | 414/291 |

FOREIGN PATENT DOCUMENTS 2457214  1/1981  France .............. 414/137.4

Primary Examiner—David H. Brown
Attorney, Agent, or Firm—Kenyon & Kenyon

[57] ABSTRACT

An arrangement for unloading bulk material from the hold (12) of a freighter (11) which includes a hatch cover (25) in combination with a lifting screw (14) or similar unloading means which is lowered down into the hold (12) via the associated loading hatch (13). The hatch cover (25), which is adapted to rest on a coaming (26) on loading hatch (13) of the freighter (11) via an annular cover frame (34), is provided with a cover portion (31) pivotably mounted about a vertical axis (31a) having a vertical through-going guide (30) for the reception of the unloading means (14) for swinging of the same in a path forwards and backwards from one side portion of the hatch cover to the middle of the hatch. The cover portion (31) is allowed to turn in the cover frame (34) with corresponding movement of the unloading means (14). The hatch cover (25) including the cover portion (31) covers the hatch opening outside the vertical through-going guide (30), which is defined by the covering from approximately the middle of the cover portion (31) and outwards towards the periphery of the cover portion.

14 Claims, 2 Drawing Sheets

ARRANGEMENTS FOR UNLOADING BULK MATERIAL FROM HOLDS OF CARGO VESSELS

This invention relates to an arrangement for unloading bulk material from the holds of cargo vessels.

There is a problem in connection with unloading freighters which transport bulk material in the form of powder or similar fine-grained material, for example, cement, in that dust clouds arise in and on the freighter. In many harbours where a prohibition exists against the occurrence of such dust clouds, it is difficult to carry out the unloading in a justifiable manner at low cost.

It is an object of the invention to prevent the occurence of a dust cloud outside a loading hatch of a freighter during an unloading operation.

It is another object of the invention to provide a hatch cover of relatively simple construction which permits unloading while at the same time eliminating the occurence of a dust cloud outside a loading hatch.

Accordingly, the present invention resides in an arrangement for unloading bulk material from a hold of a freighter which comprises a cover of a hatch adapted for use in combination with means for unloading said bulk material from said hold via an associated loading hatch, the hatch cover being adapted to rest on a coaming on said loading hatch via an annular cover frame and being provided with a cover portion pivotably mounted about a vertical axis and having a vertical through-guide for reception of said unloading means for swinging the latter in a path forwards and backwards from one side portion of the hatch to about the middle of the hatch, said cover portion being allowed to turn in the cover frame with a corresponding movement of the unloading means and said hatch cover including the cover portion covering the opening of the hatch outside the vertical through-guide which is defined from approximately the middle of the cover portion and outwards towards the periphery thereof.

By means of the afore-mentioned arrangement the unloading means is moveable effectively and unhindered in various directions relative to the loading hatch of the freighter for localising the lower end of the unloading device in the different regions of interest of the hold of the freighter during the unloading operation, while almost the whole of the opening of the loading hatch—that is to say with the exception of the limited opening which the vertical through-guide in the cover portion represents—can be covered simply and effectively. In this way, the hatch opening can be covered so that dust clouds from the unloading operations can be prevented from penetrating outside the hatch opening. In addition, the covering can effectively prevent the intrusion of rain or other precipitation into the hold. By means of the said through-guide for the unloading means which ensures a free vertical axial movement and a relatively free pivotal movement of the unloading means relative to the cover portion, the cover portion can—by certain pivotal movements of the unloading means—be carried along in such a movement by rotating the cover portion relative to the stationarily fixed peripheral portion of the hatch cover.

By employing a relatively limited opening in the guide, one can ensure that the unloading means develops a certain, lower pressure than the surroundings (for example of a magnitude of 150 mm water column) in the hold so that a constant air flow to the hold can be ensured via the opening of the guide. This air flow will effectively contribute to prevent dust clouds which necessarily arise in the hold during the unloading operation from being forced outside the opening of the loading hatch.

It is preferred that the hatch cover is suspended in support means of the unloading means for movement to and from the loading hatch of the freighter together with the unloading means with the latter threaded through the vertical through-guide of the hatch cover. By this, there is the possibility, before each unloading operation, of mounting the hatch cover effectively in position on the hatch opening at the same time as the unloading means is set in a position ready for operation relative to the relatively limited dimension of the opening which is formed by said throughguide in the hatch cover. Correspondingly, there is the possibility, after the conclusion of the unloading operation, of removing the hatch cover and the unloading means in an easily controllable manner so that the hatch cover and the unloading means can be made ready in an easy manner for a subsequent unloading operation.

In order to avoid complications in the support and control means for the unloading means in a case where the unloading means and the hatch cover are to be supported by common support and control means, it is of great significance that the hatch cover has little weight and can be turned relatively unimpeded together with the unloading means when the latter is moved relative to the hatch opening. In this connection, it is preferred that the hatch cover is designed as a light weight construction which comprises a simple framework with canvas covering material and that the framework of the cover portion consists of a rigid outer rim portion and a rigid inner hub portion which are connected to each other via intermediate rib-like connecting means, preferably in the form of wire, the framework in the peripheral portion of the hatch cover including a circularly extending rail which forms a guide and support means for prop and support wheels which are pivotably mounted on the rim portion of the cover portion.

Constructionally, it is preferred that the rim portion is formed by a tubular annular member and the hub portion is formed by a sleeve member extending axially relative to the rim portion, and that the connecting means consist of a first set which extend from an inner portion of the rim portion facing radially inwards in pairs in a radial path to opposite axial ends of the hub portion and a second set which extend from an inner portion of the rim portion facing radially inwards in pairs in a tangential path relative to the hub portion to opposite axial ends of the hub portion, two pairs of the tangentially extending connecting means forming lateral boundaries of the guide which passes between the rim portion and the hub portion.

Figure 2:
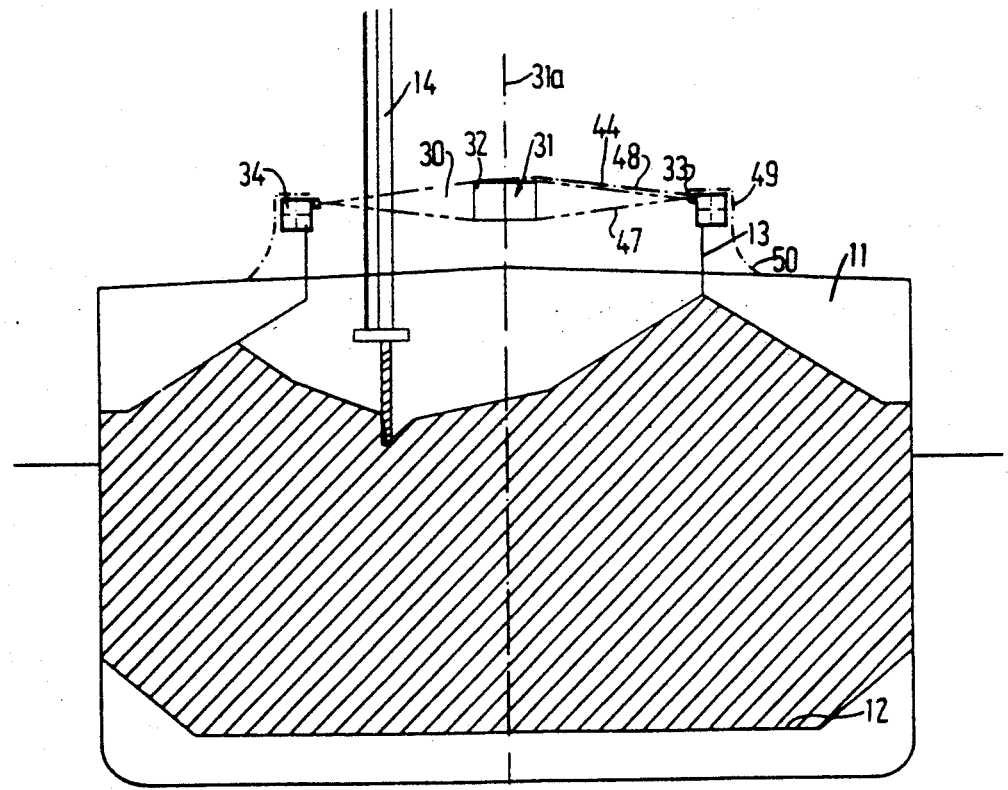
Figure 3:
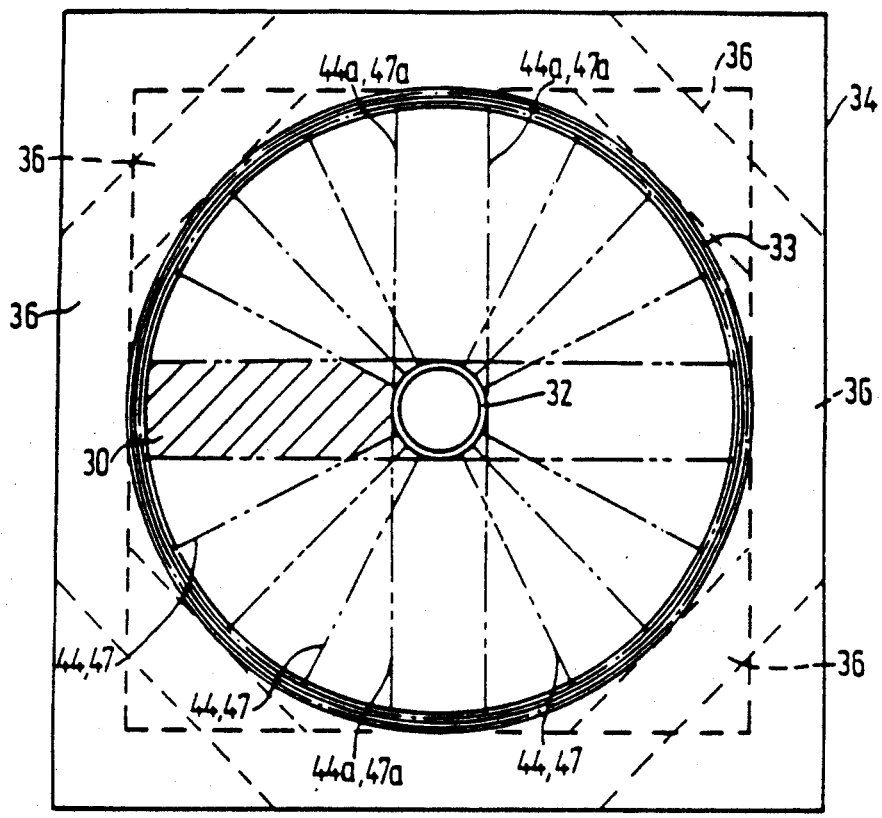
Figure 4:
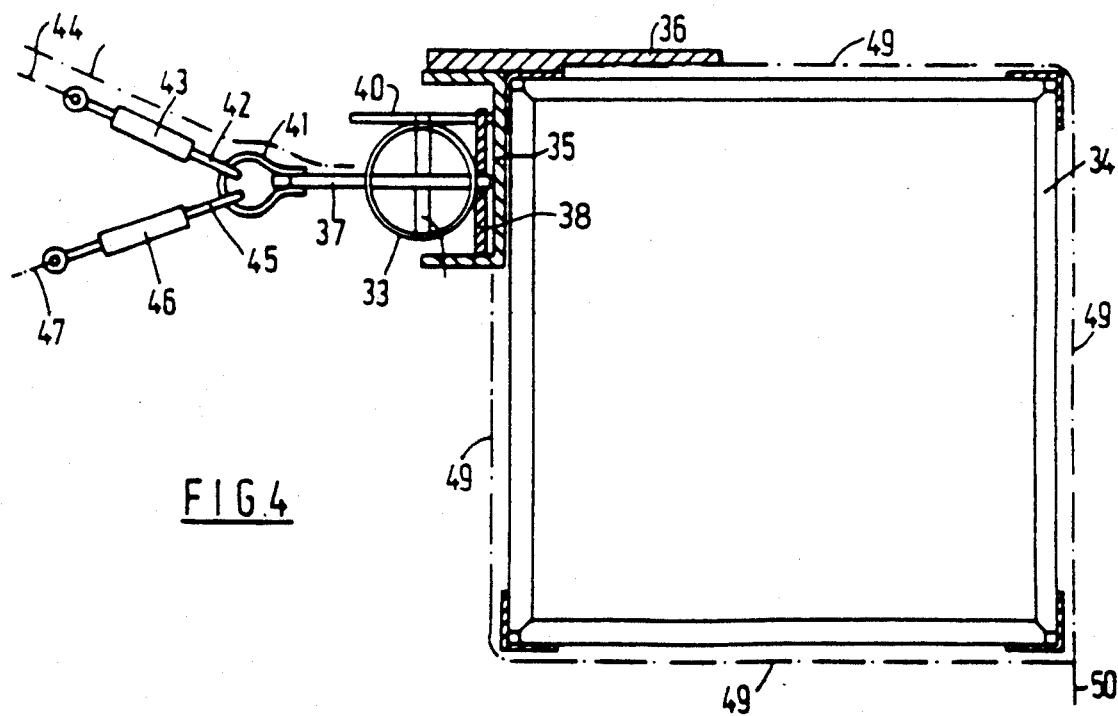

These and other objects and advantages of the invention will become more apparent from the following detailed description taken in conjunction with the accompanied drawings wherein:

FIG. 1 shows an arrangement partially in an end representation and partially in section of a factory ship and a freighter and associated equipment for unloading bulk material from the freighter to the factory ship, FIG. 2 is a section of the freighter on a larger scale during the unloading operation, FIG. 3 is a representation of a hatch cover seen from above, and FIG. 4 is a vertical section of a detail of the hatch cover.

Referring to FIG. 1, there is shown a factory ship 10 and a freighter (bulk ship) 11. The freighter 11 transports bulk material, such as cement, in a hold 12. The cargo is transported, via a loading hatch 13 of the freighter 11, by means of a vertically disposed lifting means such as a screw 14 upwardly to a horizontal transport means 15 and further via a loading tower 16 on the factory ship 10 to transport means 17 on the factory ship and further to hold 18 of the factory ship.

The lifting screw 14 and the transport equipment cooperating therewith on the factory ship are of a construction known per se and will not be described in further detail herein.

It is evident from FIG. 1 that the lifting screw 14 can be pivoted about a horizontal axis (at 19) at the upper end of the lifting screw by means of a pressure medium cylinder 20 fixed to a derrick 21 which includes the horizontal transport means 15. The lower end of the lifting screw 14 can thereby be swung forwards and backwards in an arc as is shown by a double arrow A. By swinging the derrick 21 about a horizontal axis (at 22) at its inner end, the lifting screw 14 can be correspondingly raised and lowered relative to the bottom of the hold 12. By swinging the derrick 21 about a vertical axis (at 23), the lifting screw 14 can be moved sideways in the hold 12.

A hatch cover 25 is shown which rests on top of a coaming 26 which defines the loading hatch 13. The hatch cover 25 is fastened by means of a pair of hoisting line portions 27 which are secured to a peripheral portion of the hatch cover 25 at opposite sides of the hatch cover, to a hoisting hook 28 of a hoisting line which is controlled from a winch (not shown) on the loading tower 16. On an intermediate side of the hatch cover 25 there is fastened a fastening line 29 which is controlled by a second winch (not shown) at the upper end of the lifting screw 14.

The lifting screw 14 is shown threaded through a vertical through-going guide opening 30 in the hatch cover 25. The guide opening 30 has, as shown in FIG. 3, a limited dimension longitudinally and laterally in a hatch cover section 31 of the hatch cover 25. The hatch cover section 31 has the general form of a wheel (for example, a bicycle wheel) with an inner hub portion 32 and an outer rim portion 33. The hatch cover section 31 is rotatably mounted about a vertical axis 31a through the mid-point of the hub portion 32. The longitudinal dimension of the guide 30 is defined between the hub portion 32 and the rim portion 33 and has a breadth dimension corresponding substantially to the diameter of the hub portion 32.

During unloading, the lifting screw 14 can be moved relatively unimpeded in a swinging movement forwards and backwards in the guide 30 between the hub portion 32 and the rim portion 33 in the position illustrated in FIG. 3 and relatively unimpeded in a vertical movement through the guide 30. On movement of the lifting screw 14 sideways relative to the loading hatch, the lifting screw 14 thrusts against one side portion of the guide 30 and brings the cover section 31 into a corresponding swinging movement about the axis 31a through the mid-point of the hub portion 32.

In order to obtain the lightest possible hatch cover, there is shown a special light-weight construction for the cover section 31 as well as for a peripheral portion comprising a framework 34 which surrounds the cover section 31. More specifically, the framework 34 is constructed of a trussed frame construction, as is shown to the right of FIG. 4. Internally in the trussed frame construction, there is arranged a guide rail 35 with a C-shaped profile having the profile opening facing horizontally inwards towards the cover section 31. On top of the framework 34, there extends a gangway consisting of expanded metal which, if necessary, can also reinforce the framework. In the guide rail 35, there is received the rim portion 33 of the cover section which has the form of an annular ring. With suitable intermediate space along the periphery of the ring, there extends a bar 37 through the cross-section of the ring. On the convex side of the ring, there is rotatably mounted on the bar a first support wheel 38 which runs on the lower flange of the C shaped rail 35 and which can find support against the upper flange of the C shape. On a bar 39 which passes across the ring in a vertical direction, there is rotatably mounted a second support wheel 40 which forms a support against the web portion of the C shaped rail 35 on the inwardly facing side of the C shaped rail 35.

To the inwardly facing end of the bar 37, there is fastened a first shackle 41 which is connected to a second shackle 42 fastened to a first tension rod 43 the opposite end of which is connected to a rib-like connecting means in the form of a tension wire 44. A third shackle 45, which is also connected to the first shackle 41, is correspondingly fastened to a second tension rod 46, the opposite end of which is connected to a tension wire 47. The opposite ends of the tension wires 44 and 47 are connected to a fastening on upper and lower end portions of the hub portion 32 respectively. In FIG. 3, an arrangement is illustrated of twelve pairs of tension wires 44, 47 which constitute a first set and which pass, in pairs, substantially in a radial plane between the rim portion 33 and the hub portion 32 together with a second set of four pairs of tension wires 44a, 47a which pass from the rim portion 33 tangentially to the hub portion 32, that is to say in alignment with a corresponding pair of tension wires on diametrically opposite sides of the hub portion 32. For example, at each or every other bar 37, a support wheel 38 is designed for thrusting the rim portion 33 of the cover section against the framework.

The whole top surface of the cover section is covered by a covering such as canvas material 48—with the exception of a cavity as illustrated by the guide 30. Equivalently, over the whole top surface and sides of the framework, there is effected a corresponding covering with a canvas material 49. As shown in FIG. 2, the canvas material 49 is extended with a free-ending skirt portion 50 which forms a seal against the deck of the vessel outside the hatch opening 13.

Provision is made for ensuring a certain lower pressure than the surroundings in the hold (for example, 150 mm water column) so that one constantly gets an air flow inwardly through the opening in the guide 30. This air flow will effectively prevent a cloud of dust, which is necessarily produced in the hold, from penetrating outside the hatch cover.

I claim:

1. An arrangement for unloading bulk material from a hold of a freighter which comprises a cover of a hatch adapted for use in combination with means for unloading said bulk material from said hold via an associated loading hatch, the hatch cover being adapted to rest on a coaming on said loading hatch via an annular cover frame and being provided with a cover portion pivotably mounted about a vertical axis and having a vertical through-guide for reception of said unloading means for swinging the latter in a path forwards and backwards from one side portion of the hatch to about the middle of the hatch, said cover portion being allowed to turn in the cover frame with a corresponding movement of the unloading means and said hatch cover including the cover portion covering the opening of the hatch outside the vertical through-guide which is defined from approximately the middle of the cover portion and outwards towards the periphery thereof.

2. The arrangement according to claim 1, wherein the hatch cover is suspended by support means of the unloading means for movement towards and away from the loading hatch together with said unloading means with the latter threaded through the vertical through-guide of the hatch cover.

3. The arrangement according to claim 1, wherein the hatch cover has a light weight construction comprising a single framework having canvas covering material and of which the cover portion consists of a rigid, outer rim portion and a rigid, inner hub portion connected together via intermediate, rib-like connecting means while the annular cover frame in the peripheral portion of the hatch cover includes a circularly extending rail which forms a guide track and support means for prop and support wheels which are pivotably mounted on the rim portion of the cover portion.

4. The arrangement according to claim 3, wherein the rib-like connecting means is in the form of wire.

5. The arrangement according to claim 3 or 4, wherein the rim portion is formed by a tubular annular member and the hub portion is formed by a sleeve member extending axially relative to said rim portion while the rib-like connecting means consist of a first set extending in pairs in a radial contour from an inner portion of said rim portion facing radially inwards to opposite axial ends of said hub portion and a second set extending in pairs in a tangential contour relative to said hub portion from said inner portion of the rim portion to opposite axial ends of said hub portion, two pairs of the tangentially extending connecting means forming lateral boundaries of the through-guide which passes between the rim portion and the hub portion.

6. A hatch cover comprising
   a framework for mounting about a hatch of a ship; and
   a cover section rotatably mounted within said framework and including a guide opening of limited longitudinal and lateral dimension extending radially thereof to provide for passage of an unloading means into a hold of the ship.

7. A hatch cover as set forth in claim 6 wherein said cover section includes a centrally disposed hub portion, an outer rim portion movably mounted in said framework and a plurality of radially disposed rib-like means connecting said hub portion and said rim portion together.

8. A hatch cover as set forth in claim 7 wherein said cover section includes pairs of wires extending tangentially of said hub portion and secured at opposite ends to said rim portion to selectively define said guide opening therebetween.

9. A hatch cover as set forth in claim 7 wherein each rib-like means is a wire.

10. A hatch cover as set forth in claim 9 claim wherein said cover section further includes a covering disposed over and across said wires and extending to said guide opening.

11. A hatch cover as set forth in claim 10 wherein said covering is made of canvas.

12. In combination,
   a hatch cover having a framework for mounting on a coaming of a ship and a cover section rotatably mounted within said framework and including a guide opening of limited longitudinal and lateral dimension extending radially thereof;
   an unloading means for passage through said guide opening into a hold of a ship; and
   support means for suspending said unloading means and said hatch cover therefrom over a hatch of a ship.

13. The combination as set forth in claim 12 wherein said unloading means is a lifting screw.

14. The combination as set forth in claim 13 which further comprises means for swinging said lifting screw within said guide opening.

* * * * *